G. E. WADLEIGH & T. E. GARRISON.
BEAN SAVING DEVICE FOR THRESHING MACHINES.
APPLICATION FILED MAY 1, 1916.
1,253,312. Patented Jan. 15, 1918.
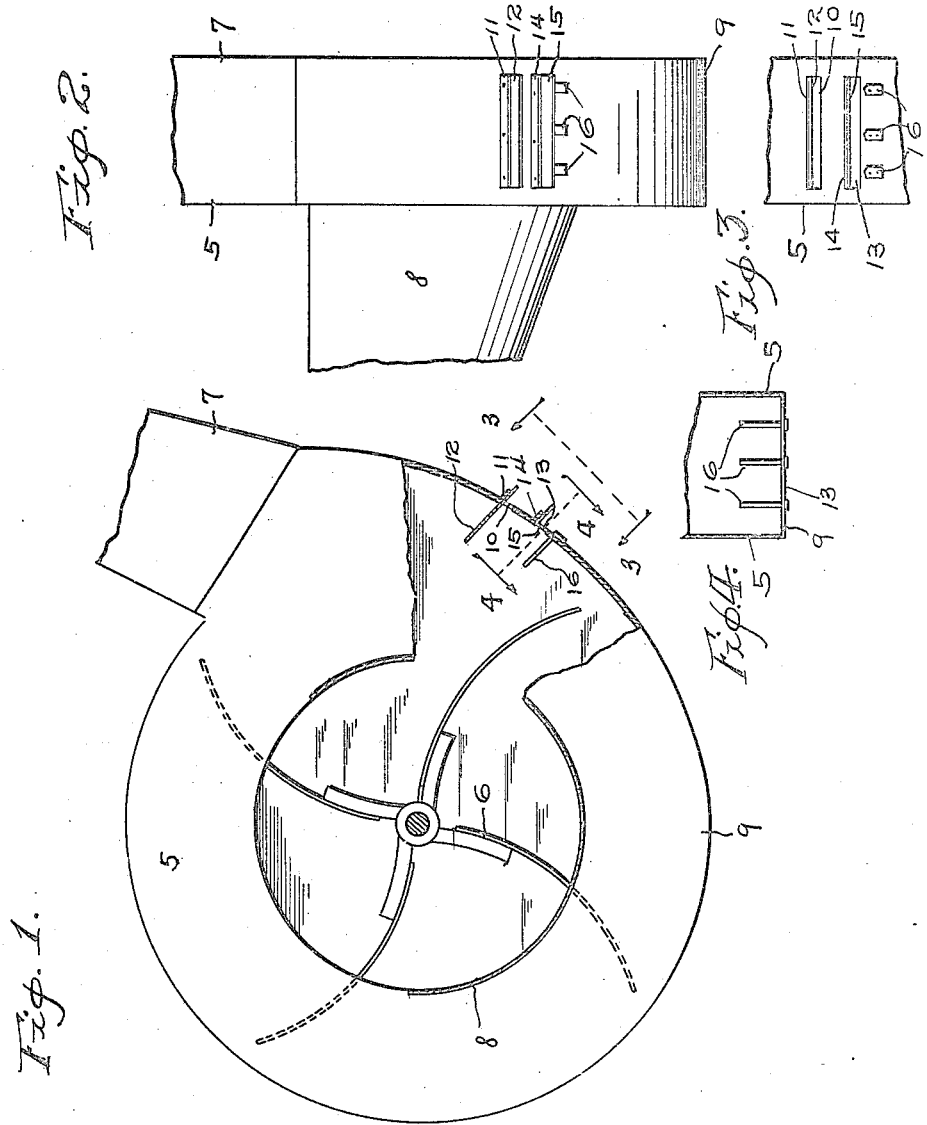
WITNESSES:
INVENTORS:
George E. Wadleigh and
Thomas E. Garrison,
BY James A. Walsh,
ATTORNEY

UNITED STATES PATENT OFFICE.

GEORGE E. WADLEIGH AND THOMAS E. GARRISON, OF TOLEDO, OHIO, ASSIGNORS TO THE INDIANA MANUFACTURING COMPANY, OF INDIANAPOLIS, INDIANA, A CORPORATION OF WEST VIRGINIA.

BEAN-SAVING DEVICE FOR THRESHING-MACHINES.

1,253,312.  Specification of Letters Patent.  Patented Jan. 15, 1918.

Application filed May 1, 1916. Serial No. 94,569.

*To all whom it may concern:*

Be it known that we, GEORGE E. WADLEIGH and THOMAS E. GARRISON, citizens of the United States, residing at Toledo, in the county of Lucas and State of Ohio, have invented certain new and useful Improvements in Bean-Saving Devices for Threshing-Machines, of which the following is a specification.

In the operation of threshing machines, when the material is in dry condition, the bean pods become readily broken and the beans threshed therefrom while being operated upon by the usual cylinder and concave teeth, by which, and the separating devices coöperating therewith, the beans are practically all saved in the machine, and the refuse or fodder from which the beans have been separated is discharged from the rear end of the machine to be conveyed away by the ordinary pneumatic or wind stacker. However, when the crop contains more or less unmatured or green and wet beans, the pods are tough and somewhat difficult to split or break, and consequently pass through the cylinder and concave in unthreshed condition, to be propelled through the machine with the fodder, and the whole mass discharged therefrom into the wind stacker hopper, to be withdrawn into the fan casing by the suction produced by the stacker fan, and thereby ejected through the stacker or chute onto the fodder pile, where such unthreshed beans become lost and wasted.

It is our object to provide means in connection with the wind stacker to thresh out such green pods and separate the beans therefrom and divert the same from the fodder mass into a suitable receptacle or conveyer to be saved, the arrangement being such as to insure that the fodder only will be discharged onto the pile.

In the accompanying drawing, forming a part hereof, Figure 1 is a side elevation of a pneumatic stacker fan, the drum being partially broken away to show our improved bean threshing and saving device positioned therein; Fig. 2 an end elevation of said fan showing in fragment the ordinary hopper communicating therewith, and Figs. 3 and 4 are detail sectional views taken on the dotted lines 3—3 and 4—4 respectively in Fig. 1.

In the drawing, 5 indicates the fan casing, 6 the fan therein, 7 the outlet or chute of said fan through which material is ejected, 8 the hopper in which material from the thresher is received in its passage to the stacker fan, and 9 is the periphery or rim of the fan casing, all of which parts may be of any usual and well known construction and arrangement.

In the rim 9 of the casing we form an opening, 10, preferably by slitting the material and bending a lip, 11, outwardly therefrom, to which lip we affix a deflecting plate, 12, which projects into the drum and slightly outside thereof. Below said opening 10 we also provide a similar opening, 13, and lip, 14, to which latter we affix an outwardly projecting deflecting plate, 15; and below said opening 13 we insert a series of tines or fingers, 16, which may be secured in any desired manner, said fingers and the plate 12 being preferably of a straight form and projecting into the casing to such extent as to escape the path of travel of the ends of the rotating fan blades. These devices are arranged in the casing at substantially the point where the material leaves the tips of the fan wings, so that it is instantly and forcibly driven against the threshing tines and deflector and subjected to rethreshing.

In the operation of threshing, as will be understood, the material discharged from the rear end of the thresher enters the stacker hopper 8 from which it is withdrawn into the fan casing 5 by the suction influence of the stacker fan 6 and is ejected thereby through the chute 7 and deposited in a pile or otherwise, as desired. In handling this material it is carried by the ends of the fan blades and the blast produced thereby along the inner side of the rim 9 and while being ejected comes in contact with the threshing fingers 16, causing the separation and bursting of the green or wet bean pods against said fingers, the beans from which fly upwardly against the plate 12 and are diverted downwardly thereby, and escape through the openings 10 and 13 into any suitable receptacle or conveyer and are thus saved from the fodder, which latter is carried by the blast through the threshing fingers and over the end of the deflecting plate 12 by which it is deflected to follow the blast into the ejecting chute. In practice it has been found that such plate does not dissipate or retard the air current produced by the fan and that there is a vacuum between said plate and the rim, so that the force of the threaded beans is largely spent after contacting with the plate, and by gravity or rebounding they pass through the outlets covered by the outwardly extending deflectors described and by which they are directed into a suitable receptacle or conveyer to be saved.

We claim as our invention:

1. In a bean saving device for threshing machines, a material receiving and conveying receptacle, a fan casing communicating therewith and having an outlet in its periphery, a fan in said casing for withdrawing material from said receptacle into said casing and ejecting the same, means in said casing projecting toward and against which such material is driven by the action of said fan and by which beans are threshed from the pods contained in said material, and means in said casing projecting toward said fan for diverting said threshed beans through said outlet in said casing.

2. In a bean saving device for threshing machines, a material receiving and conveying receptacle, a fan casing communicating therewith and having an outlet in its periphery, a fan in said casing for withdrawing material from said receptacle into said casing and ejecting the same, means in said casing against which such material is driven by the action of said fan and by which beans are threshed from pods contained in said material, and a deflector in said casing above said threshing means and projecting toward said fan for downwardly diverting said threshed beans through said outlet.

3. In a bean saving device for threshing machines, a material receiving and conveying receptacle, a fan casing communicating therewith and having an oulet in its periphery, a fan in said casing for withdrawing material from said receptacle into said casing and ejecting the same, and fingers in said casing projecting toward and in the path of travel of the material moved by said fan against which such material is driven by the action of said fan and by which beans are threshed from pods contained in said material.

4. In a bean saving device for threshing machines, a material receiving and conveying receptacle, a fan casing communicating therewith and having an outlet in its periphery, a fan in said casing for withdrawing material from said receptacle into said casing and ejecting the same, threshing fingers in the interior of said casing projecting toward said fan and below said outlet, and a deflector in the interior of said casing projecting toward said fan and above said outlet, whereby beans driven against said fingers by said fan are threshed and deflected downwardly through said outlet.

5. In a bean saving device for threshing machines, a material receiving and conveying receptacle, a fan casing communicating therewith and having an outlet in its periphery, a fan in said casing for withdrawing material from said receptacle into said casing and ejecting the same, means projecting toward and in the path of travel of the material moved by said fan in said casing for rethreshing beans from their pods, a deflector in said casing projecting toward said fan for directing such threshed beans downwardly, and a deflector over said outlet and projecting from the outer side of said fan casing for directing such beans into a receptacle.

In testimony whereof we affix our signatures in presence of two witnesses.

GEORGE E. WADLEIGH.
THOS. E. GARRISON.

Witnesses:
JOHN AUXTER,
J. A. WALSH.

Copies of this patent may be obtained for five cents each, by addressing the "Commissioner of Patents, Washington, D. C."

It is hereby certified that in Letters Patent No. 1,253,312, granted January 15, 1918, upon the application of George E. Wadleigh and Thomas E. Garrison, of Toledo, Ohio, for an improvement in "Bean-Saving Devices for Threshing-Machines," errors appear in the printed specification requiring correction as follows: Page 1, line 98, for the word "beams" read *beans;* page 2, line 4, for the word "threaded" read *threshed;* and that the said Letters Patent should be read with these corrections therein that the same may conform to the record of the case in the Patent Office.

Signed and sealed this 5th day of March, A. D., 1918.

[SEAL.]

R. F. WHITEHEAD,
*Acting Commissioner of Patents.*

Cl. 130—30.